US012086238B2

(12) United States Patent
Fischer

(10) Patent No.: US 12,086,238 B2
(45) Date of Patent: Sep. 10, 2024

(54) METHODS AND SYSTEMS FOR CONTROLLING ACCESS TO AT LEAST ONE COMPUTER PROGRAM

(71) Applicant: Siemens Aktiengesellschaft, Munich (DE)

(72) Inventor: Jan-Gregor Fischer, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/023,620

(22) PCT Filed: Aug. 13, 2021

(86) PCT No.: PCT/EP2021/072593
§ 371 (c)(1),
(2) Date: Feb. 27, 2023

(87) PCT Pub. No.: WO2022/043095
PCT Pub. Date: Mar. 3, 2022

(65) Prior Publication Data
US 2023/0244782 A1    Aug. 3, 2023

(30) Foreign Application Priority Data
Aug. 28, 2020  (EP) .................................... 20193343

(51) Int. Cl.
*G06F 21/54*  (2013.01)
*G06F 11/36*  (2006.01)
*G06F 21/62*  (2013.01)

(52) U.S. Cl.
CPC .......... *G06F 21/54* (2013.01); *G06F 11/3636* (2013.01); *G06F 21/6218* (2013.01)

(58) Field of Classification Search
CPC ... G06F 21/54; G06F 11/3636; G06F 21/6218
See application file for complete search history.

(56) References Cited

U.S. PATENT DOCUMENTS 6,282,701 B1 *  8/2001  Wygodny ........... G06F 11/3664
                                                  709/224
6,367,032 B1 *  4/2002  Kasahara ........... G06F 11/2236
                                                  714/25

(Continued)

OTHER PUBLICATIONS

PCT International Search Report and Written Opinion of International Searching Authority mailed Nov. 4, 2021 corresponding to PCT International Application No. PCT/EP2021/072593 filed Aug. 13, 2021.

*Primary Examiner* — Jason Chiang
(74) *Attorney, Agent, or Firm* — Henry M. Feiereisen LLC

(57) ABSTRACT

A method for controlling access to at least one computer program which is accessible and executable on an embedded system is disclosed. The embedded system is provided and comprises two different runtime modes, a first runtime mode and a second runtime mode. In the first runtime mode, a predefined set of IT-security constraints is associated with the at least one computer program. In the second runtime mode at least a part of the predefined set of the IT-security constraints associated with the at least one computer program is void and the at least one computer program is accessible and executable with elevated rights for performing software development operations on the at least one computer program. The embedded system is set into the second runtime mode for a predefined time period. After the predefined time period is expired, the embedded system is set into the first runtime mode.

15 Claims, 2 Drawing Sheets

(56) References Cited

U.S. PATENT DOCUMENTS

| | | | | |
|---|---|---|---|---|
| 6,453,435 | B1* | 9/2002 | Limon, Jr. | G01R 31/31912 714/724 |
| 6,757,829 | B1* | 6/2004 | Laczko, Sr. | H04N 21/4405 717/124 |
| 7,418,697 | B2* | 8/2008 | Gryko | G06F 11/3664 717/124 |
| 9,146,832 | B2* | 9/2015 | Degenhardt | G06F 11/3632 |
| 9,183,113 | B2* | 11/2015 | Smiljanic | G06F 11/3652 |
| 9,898,385 | B1* | 2/2018 | O'Dowd | G06F 11/3476 |
| 10,460,122 | B1* | 10/2019 | Kirby | H04L 63/101 |
| 10,528,454 | B1* | 1/2020 | Baraty | G06F 11/3684 |
| 10,884,831 | B2* | 1/2021 | van der Veen | G06F 8/41 |
| 2002/0104071 | A1* | 8/2002 | Charisius | G06F 8/71 717/109 |
| 2004/0031019 | A1* | 2/2004 | Lamanna | G06F 11/3664 717/125 |
| 2006/0129991 | A1 | 6/2006 | Dostert et al. | |
| 2009/0254753 | A1* | 10/2009 | De Atley | G06F 21/51 713/176 |
| 2009/0271472 | A1* | 10/2009 | Scheifler | G06F 9/5072 709/202 |
| 2009/0307783 | A1* | 12/2009 | Maeda | G06F 11/3648 726/30 |
| 2010/0293342 | A1* | 11/2010 | Morfey | G06F 9/30167 711/E12.001 |
| 2011/0252404 | A1* | 10/2011 | Park | G06F 11/3664 717/124 |
| 2012/0102465 | A1* | 4/2012 | Bates | H04L 67/10 717/124 |
| 2012/0222010 | A1* | 8/2012 | Wu | G06F 9/44521 717/124 |
| 2013/0132933 | A1* | 5/2013 | Rajaram | G06F 11/3636 717/126 |
| 2013/0263090 | A1* | 10/2013 | Polk | A63F 13/60 717/124 |
| 2013/0321849 | A1* | 12/2013 | Masui | G06K 15/1809 358/1.14 |
| 2014/0082157 | A1* | 3/2014 | Raber | H04L 41/0803 709/220 |
| 2014/0108876 | A1* | 4/2014 | Pathak | G01R 31/318588 714/E11.155 |
| 2015/0242293 | A1* | 8/2015 | Segger | G06F 11/3476 714/33 |
| 2015/0317240 | A1* | 11/2015 | Li | G06F 8/443 714/38.1 |
| 2017/0310648 | A1* | 10/2017 | Levchenko | H04L 63/0464 |
| 2017/0353458 | A1 | 12/2017 | Lipke et al. | |
| 2018/0121323 | A1* | 5/2018 | Tucker | G06F 11/3624 |
| 2018/0165183 | A1* | 6/2018 | Kremp | G06F 21/6218 |
| 2019/0042397 | A1* | 2/2019 | Vignesh R | G06F 11/3692 |
| 2019/0196801 | A1* | 6/2019 | Sasaki | H04L 9/3242 |
| 2019/0325108 | A1* | 10/2019 | Turek | G06N 3/08 |
| 2019/0370148 | A1* | 12/2019 | Du | G06F 11/302 |
| 2019/0384694 | A1 | 12/2019 | Ramraz et al. | |
| 2020/0076680 | A1* | 3/2020 | Pruitt | H04L 41/20 |
| 2020/0117581 | A1* | 4/2020 | Rajapakse | G06F 11/3664 |
| 2021/0055718 | A1* | 2/2021 | Rathgeb | H04L 9/3239 |
| 2021/0117308 | A1* | 4/2021 | Burgos | G06F 11/3624 |
| 2021/0216306 | A1* | 7/2021 | Moeller | G06F 8/656 |
| 2021/0240839 | A1* | 8/2021 | Tsirkin | G06F 21/554 |
| 2021/0318919 | A1* | 10/2021 | Talvitie | G06F 11/3696 |
| 2022/0237007 | A1* | 7/2022 | Bleve | G06F 9/455 |

\* cited by examiner

METHODS AND SYSTEMS FOR CONTROLLING ACCESS TO AT LEAST ONE COMPUTER PROGRAM

CROSS-REFERENCES TO RELATED APPLICATIONS

This application is the U.S. National Stage of International Application No. PCT/EP2021/072593 filed Aug. 13, 2021, which designated the United States and has been published as International Publication No. WO 2022/043095 A1 and which claims the priority of European Patent Application, Serial No. 20193343.9, filed Aug. 28, 2020, pursuant to 35 U.S.C. 119(a)-(d).

BACKGROUND OF THE INVENTION

The invention relates to a method and a system for controlling access to at least one computer program, wherein the at least one computer program, in particular an app, is accessible and executable on an embedded system, in particular on an edge device, more particularly on an industrial edge device.

Edge computing aims at bridging the gap between IT and OT—e.g. between the cloud and machines—to bring new functionalities such as AI and data analytics to the shop floor.

Devices, e.g. edge devices, embedded into automation systems, such as SCADA (short for Supervisory Control and Data Acquisition), provide ground for creating an Edge app ecosystem that allows original as well as $3^{rd}$ party apps on such embedded devices.

In order to establish a secure edge computing eco system the edge device(s) must be equipped with a secure operating and edge app runtime system. To this end, the edge device(s) and all Installed edge apps must obey certain IT-security related rules that are applied in production environments on the border between shop floor and factory networks/cloud (e.g. strict separation of both network interfaces on the edge device's software and/or hardware).

However, these IT-security constraints cannot be put in place during time of development of an edge platform and edge apps as developers (incl. $3^{rd}$ party edge app developers) need full access to the edge device for monitoring, debugging and profiling of their apps. These activities are normally carried out during development time, but also need to be conducted during normal operation in production in case of a system or app failure in certain special scenarios (e.g. during an Edge app piloting phase with a customer).

Accordingly, there is a need to provide methods and systems that allow to access the software on the embedded systems for development, debugging and test purposes both during development and normal operation phases with leveraged access rights.

SUMMARY OF THE INVENTION

In order to achieve the objective mentioned above, the present invention provides a method for controlling access to at least one computer program, wherein the at least one computer program, in particular an app, is accessible and executable on an embedded system, in particular on an edge (computing) device, more particularly on an industrial edge device. The method comprises providing the said embedded system, wherein the embedded system comprises two different runtime modes—a first runtime mode and a second runtime mode, wherein in the first runtime mode a predefined set of IT-security constraints is associated with the at least one computer program (itself and its execution on the embedded system), and wherein in the second runtime mode at least a part of the predefined set of the IT-security constraints associated with the at least one computer program is void and the at least one computer program is accessible and executable with elevated rights. The elevated (access and execution) rights allow a software developer to perform software development operations on the at least one computer program. The method further comprises setting the embedded system into the second runtime mode for a predefined time period and, after the predefined time period is expired, resetting the embedded system into the first runtime mode.

In other words, a predefined set of IT-security constraints is imposed In the first runtime mode. The predefined set of the IT-security constraints determines an access level to the least one computer program and, optionally, to the embedded system, in particular to an operational system of the embedded system (for example to change firewall setting etc.), more particularly to an application management system (e.g. to a container management system) within the operational system. IT-security constraints can also regulate operations that are allowed to be performed by the least one computer program on the embedded system and/or by the embedded system, when it executes the least one computer program. In the second runtime mode at least a part of the predefined set of the IT-security constraints is void, so that the at least one computer program and, optionally, the embedded system are accessible with elevated rights. In the second runtime mode of the embedded system the at least one computer program is also executable on the embedded system with elevated rights. The elevated rights (for accessing and executing) are granted for performing software development operations on the at least one computer program.

The second runtime mode of the embedded system allows, therefore, a software developer to access the at least one computer program and, optionally, the embedded system with elevated rights. The second runtime mode of the embedded system also allows to execute the at least one computer program with elevated rights. This means the software developer can perform (first) operations on the at least one computer program and the at least one computer program, when executed by the embedded system, cause the embedded system to carry out (second) operations, which (first and/or second) operations were not possible, when none of the IT-security constraints were void.

Providing an embedded system with the first and the second runtime and switching between these two runtime modes allows to access the software on the embedded systems for development, debugging and test purposes both during development and normal operation phases (e.g. when device is already in use in an automation system) with elevated/leveraged (access and execution) rights.

In an embodiment there can be a plurality of the computer programs, which are accessible and executable on the embedded system. In this case, at least a part of the plurality of the computer programs can be made accessible and executable with the elevated rights by switching the embedded system into the second runtime mode.

In an embodiment there can be a plurality of the embedded systems, wherein each embedded system is provided with at least one program accessible and executable on this system and wherein each embedded system comprises the first and the second runtime mode. In this embodiment one or more embedded systems of the plurality of the embedded systems can be switched back and forth between the two runtime modes, such that one or more computer programs can be accessed and executed with the elevated (access and execution) rights within the predefined time window—"developer's time window".

In an embodiment the resetting can be performed automatically of by a human, e.g. by a system administrator.

In an embodiment the method can further comprise setting at least one timer to control an expiration of the predefined time period.

In an embodiment the software development operations comprise at least one of the following:
- performing a remote login to the at least one computer program (e.g. SSH login to a Docker or OCI app container) with read and write access,
- accessing the at least one computer program's file system (e.g. WinSCP to a Docker or OCI app container) with read and write access,
- tracing the at least one computer program's log files in real-time mode (e.g. "tail—follow myapp.log"),
- attaching a debugger to a running process of the at least one computer program,
- attaching a CPU, main memory, disk or network I/O profiler to a running process of the at least one computer program,
- changing the at least one computer program's log levels (e.g. setting the log level to DEBUG).

In an embodiment the elevated rights can include at least one of the following rights:
- Remote login into containers of the at least one computer program with read-write access,
- Remote access, in particular remote read-write access to a container file system of the at least one computer program,
- Remote online log tracing of the at least one computer program,
- Remote debugging of the at least one computer program,
- Remote profiling of the at least one computer program,
- Changing log levels to include debug-related log information of the at least one computer program into log output,
- Remote login to the embedded device's base system with read-only access,
- Remote login to runtime of the at least one computer program with read-only access.

In an embodiment the base system can be an operating system, in particular an operating system comprising a container management system.

In an embodiment the method can further comprise:
- before setting the embedded device into the second runtime mode, creating, in particular automatically creating, a snapshot, in particular a full snapshot of a system of the embedded device and/or of the at least one computer program runtime and/or of the at least one computer program and/or of configuration and/or of data, and
- restoring the system to a previous state according to the snapshot, i.e. the state the system had before it was set into the first runtime mode, when setting the embedded device into the first runtime mode.

In an embodiment the snapshot is not accessible, e.g. is not readable or changeable, in the second runtime mode.

In an embodiment the embedded system can be an edge device of an automation system, in particular of a machine controller, a Supervisory Control and Data Acquisition (SCADA), more particularly of a Distributed Control System (DCS) or of a Process Control System (PCS).

In an embodiment the configuration, which can be a part of the snapshot, can be configuration data of the base system, in particular of the OS, of a container management system, of apps, in particular of apps containers.

In an embodiment the data that can be a part of the snapshot can be the at least one computer program's (e.g. app's) data (in particular recorded data of automation processes, e.g. audio/video/time series sensor/control data, of the above-mentioned automation systems).

In an embodiment the setting the embedded system into the second runtime mode for a predefined time period can be performed by a system administrator and the method can further comprise:
- requesting the system administrator to accept terms and disclaimers associated with the elevated rights, in particular, the terms and disclaimers regarding operational and/or service-level guarantees, which are in place and reading and accepting the terms and disclaimers, and, in particular,
- informing the system administrator at least once, before and/or after automatically resetting the embedded system into the first runtime mode. In this case the system administrator can get informed that the (least one) embedded system is about to be reset Into the first runtime mode and/or that it had been already reset into the first runtime mode.

In an embodiment, the system administrator can be designed as a hardware and/or software component, configured to facilitate the above-mentioned steps.

In an embodiment the method can further comprise prolonging the predefined time period prior to its expiration.

In order to achieve the objective mentioned above, also a system for controlling access to at least one computer program is provided. The at least one computer program Is accessible and executable on at least one embedded system, in particular at least one embedded device. The system comprises the said at least one embedded system with the said at least one computer program, wherein the at least one embedded system comprises two different runtime modes a first runtime mode and a second runtime mode, wherein in the first runtime mode a predefined set of IT-security constraints is associated with the at least one computer program, wherein in the second runtime mode at least a part of the predefined set of the IT-security constraints associated with the at least one computer program is void and the at least one computer program Is accessible and executable with elevated (access and execution) rights that allow a software developer to perform software development operations on the at least one computer program. The system also comprises a management system of the at least one embedded system, configured to set the at least one embedded system Into the second runtime mode for a predefined time period, and to switch the at least one embedded system into the first runtime mode after the predefined time period is expired.

In an embodiment at least two computer programs can be accessible and executable on the at least one embedded system, wherein
- in the first runtime mode a predefined set of IT-security constraints is associated with each computer program,
- in the second runtime mode at least a part of the predefined set of the IT-security constraints is void for at least one of the at least two computer programs and the at least one computer program is accessible and executable with elevated (access and execution) rights.

In an embodiment there can be a plurality of the computer programs, which are accessible and executable on the embedded system. In this case, at least in a part of the plurality of the computer programs can be made accessible and executable with the elevated rights by switching the embedded system into the second runtime mode.

In an embodiment the system can comprise at least two embedded systems.

In an embodiment the management system can be designed as a cloud-based management system, for example a cloud-based edge device management system.

In an embodiment there can be a plurality of the embedded systems, wherein each embedded system is provided with at least one program accessible and executable on this system and wherein each embedded system comprises the first and the second runtime mode. In this embodiment one or more embedded systems of the plurality of the embedded systems can be switched back and forth between the two runtime modes, such that one or more computer programs can be accessed and executed with the elevated rights within the predefined time window—"developer's time window".

In an embodiment the embedded system can be an edge device of an automation system, in particular of a machine controller, a Supervisory Control and Data Acquisition (SCADA), more particularly of a Distributed Control System (DCS) or of a Process Control System (PCS).

In an embodiment the at least one computer program can be an edge app.

In an embodiment the management system and/or the at least one embedded system can comprise a timer, wherein the timer Is configured to control an expiration of the predefined time period.

In an embodiment the management system can comprise an apparatus for managing the at least one embedded system, in particular a backend server for managing the at least one embedded system, more particularly a cloud-backend-server for managing the at least one embedded system.

In an embodiment the management backend server can be configured to set the embedded device(s) into the second runtime mode for a predefined time period, and to switch the embedded device(s) into the first runtime mode after the predefined time period is expired.

BRIEF DESCRIPTION OF THE DRAWING

The above and other objects and advantages of the Invention will be apparent upon consideration of the following detailed description, taken in conjunction with the accompanying drawings, in which like reference characters refer to like parts throughout, and in which.

DETAILED DESCRIPTION OF PREFERRED EMBODIMENTS

Figure 1:
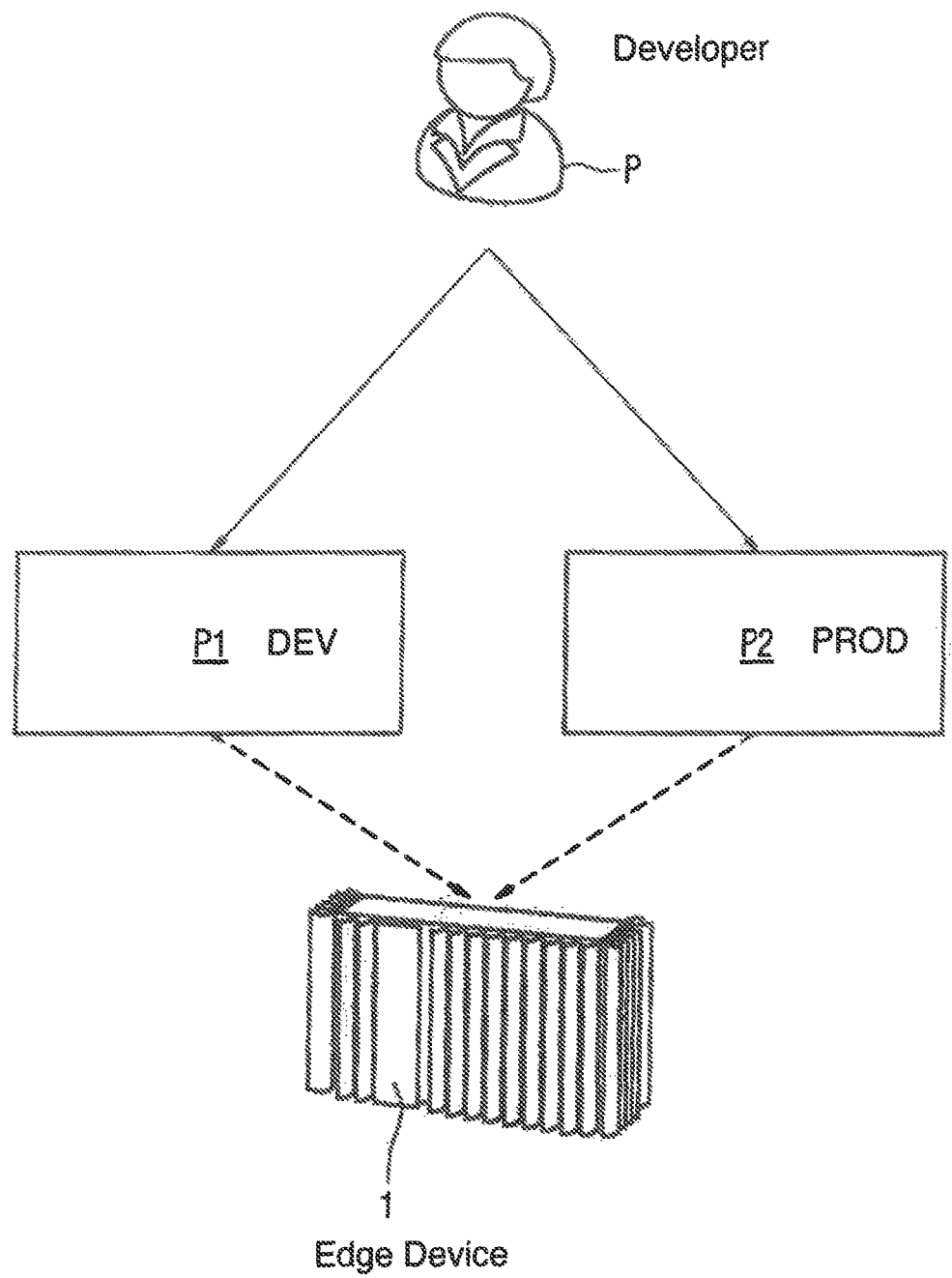
FIG. 1 a simplified software development scheme with two Images.

Turing to FIG. 1, a common situation (prior art) in a hardware-in-the-loop development context is illustrated. In a development project of a computer program (e.g. an edge app, short for edge device application software) for an embedded system (e.g. an edge device) a developer P usually sets two edge devices P1, P2 with the artifacts under development during the different phases.

First, the edge device with specialized development support—the edge device P1 in FIG. 1—is used. This device can be Implemented by a so-called developer firmware version (a "DEV" Image). The device with development support P1 runs its software without or with strongly reduced IT-security related features, e.g. allowing root access to the Edge operating system, Edge app runtime system and each Edge app. However, this is an absolute No-Go for regular productive Edge systems.

Second, the standard productive version on a production device P2 is set. This device can be implemented by a so-called "PROD" firmware version. This device applies the full IT-security related constraints as for example may be expected by an operator of an automation system and, therefore, can be for example used on a network boundary between the operator's secured OT shop floor/machine network and the operator's IT factory network/cloud.

Software developers for edge devices 1 include 3rd party edge app developers P that always start with the open DEV image, build and test their software without any IT security restrictions. Once they move over to the PROD image their software often does not work as expected. The reason can be that the IT security restrictions (e.g. no direct physical network access for standard Edge apps) are not seen early in the development phase. This implies that the problems seen on the PROD image cannot be debugged in a life manner with IDE-integrated remote debugging mechanisms, and there is also no means for fine-granular profiling the software's resource consumptions on the level of individual programming statements or on object level in object-oriented programming.

Thus, software issues are normally seen very late in the development lifecycle. This typically results in reduced time-to-market and raised development efforts and costs.

Figure 2:
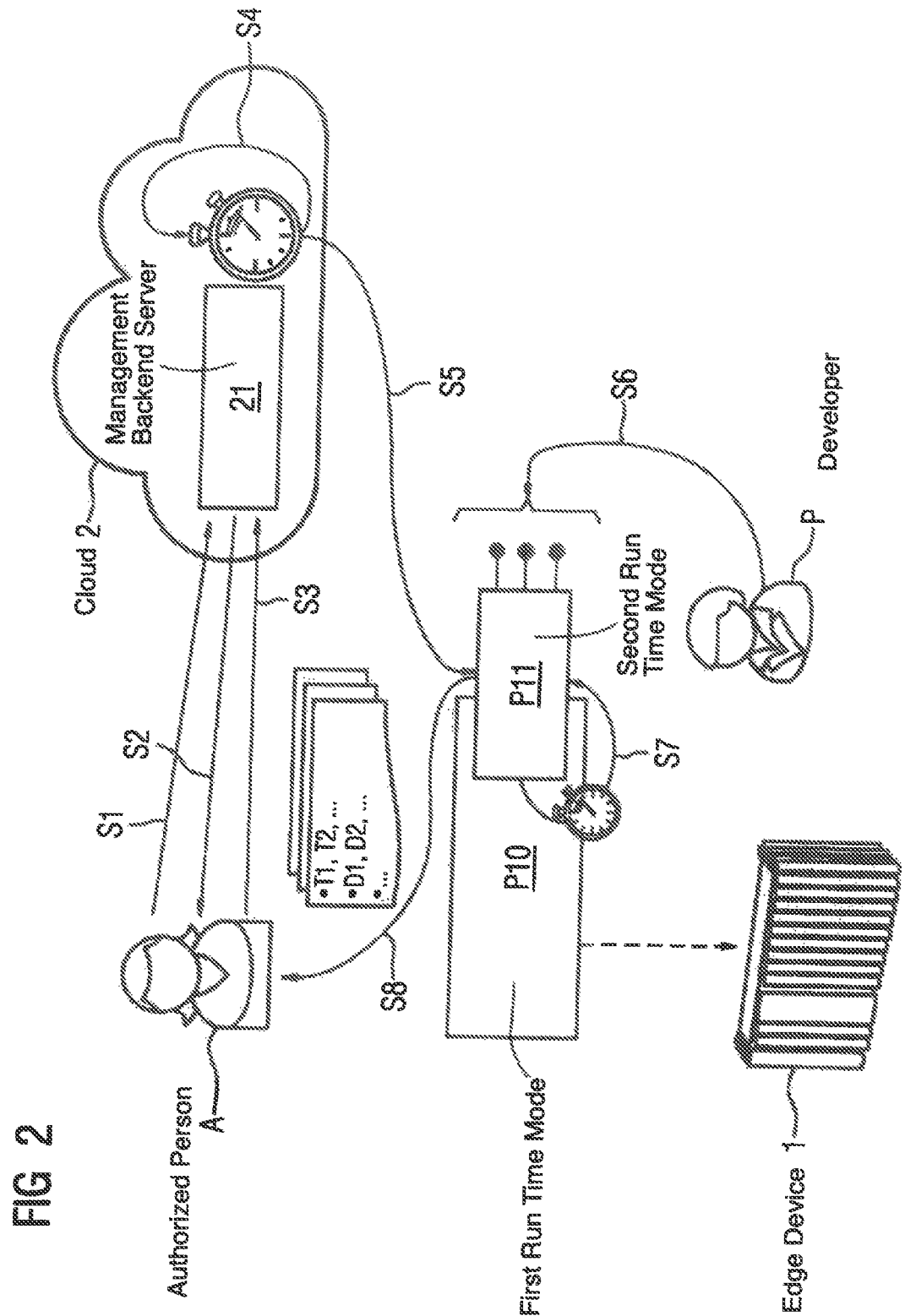
FIG. 2 a part of an ecosystem for controlling access to edge apps on edge devices and a sequence of operations controlling access to edge apps on edge devices.

FIG. 2 illustrates a method and a system that correspond to the method and to the system according to the present invention respectively.

The system comprises an edge device 1 with two runtime modes P10 and P11. The edge device 1 can be an edge device of an automation system, in particular of a machine controller, a Supervisory Control and Data Acquisition (SCADA), more particularly of a Distributed Control System (DCS) or of a Process Control System (PCS).

The edge device 1 is provided with an edge app, e.g. a production firmware, which is executable on the edge device 1.

In an embodiment the system can comprise a plurality of edge devices, wherein each edge device is provided with two said runtime modes and with an edge app or two or more or even a plurality of edge apps executable on the this edge device.

In the first runtime mode P10 a predefined set of IT-security constraints is associated with the edge app (or with at least a part of the edge apps provided on the edge device).

The set of the IT-security constraints determines an access level to the edge app and, optionally, to the edge device 1. The IT-security constraints can regulate operations that are allowed to be performed on the edge apps, by the edge app(s) on the edge device 1 and/or by the edge device 1, when it executes the edge app(s).

In the second runtime mode P11 at least a part of the predefined set of the IT-security constraints associated with the edge app(s) is void and the edge app(s) is(are) accessible and executable with elevated access and execution rights that allow a software developer P to perform software development operations on the edge app(s).

The system further comprises a cloud-based edge device management system 2. The edge device management system 2 can comprise an edge device management backend server 21 and is configured to set the edge device 1 into the second runtime mode P11 for a predefined time period, and to switch the edge device 1 into the first runtime mode P10 after the predefined time period is expired. It will be appreciated by those skilled in the art that edge device management system 2 does not necessarily have to be cloud-based. For example, it can be located at the automation factory's/automation system's site and comprise—in this context—a "local" edge device management backend server.

The edge device 1 can be or is connected to cloud-based edge device management system 2, in particular to the edge backend server 21 via one or more networks, e.g. via automation system's network (factory's network) and/or via Internet.

In one step S1 of the method the edge device 1 (or some of the plurality of the edge devices) is set into the second runtime mode P11 for a predefined time period. This can be performed by a responsible and authorized person A (e.g. by a system administrator) related to the cloud-based edge device management system 2, who uses an the edge management backend 21 in the cloud and sets the edge device 1 into the second runtime mode P11—a so-called "controlled open mode". In case of multiple edge devices, one or multiple edge devices can be set into the second runtime mode P11.

In the controlled open mode P11 edge app developers/testers can temporarily access the edge device 1 for their monitoring and debugging purposes. A typical context could be a collaboration project for piloting a new (not always stable) edge app on customer production site.

In one optional step S2 of the method the edge management backend 21 can request the admin A to accept specific terms and disclaimers T1, T2, . . . ; D1, D2, . . . , e.g. terms stating that in the phase of running an edge device 1 in open controlled mode P11 there are reduced operational/service-level guarantees in place.

In one optional step S3, the admin A needs to read and accept the terms and conditions T1, T2, . . . ; D1, D2, . . . ; in order to be able to continue.

In a step S4 of the method the edge management backend 21 can set a timer for the edge device 1 with the predefined time period. For this time window the edge app(s) can be e.g. monitored and debugged on the edge device 1 or the edge devices.

In case of a plurality of the edge devices, wherein each edge device can comprise multiple or a plurality of edge apps, the edge management backend 21 can identify the proper edge device(s), put it (them) into the controlled open mode P11 for a set of edge apps that shall be monitored and debugged and set a timer for each edge device in the second runtime mode P11.

The timer(s) set by the edge management backend 21 is(are) also called backend timer(s). In one embodiment the backend timer(s) can be displayed to the admin person A.

Once the timer reaches zero the controlled open mode P11 is switched back to the first runtime mode P10—also called "default protected mode".

Resetting the edge device 1 into the default protected mode can be performed automatically or by a human, e.g. by the system administrator A.

It can be advantageous, if—in a step S5—a second timer is set on the edge device 1 when activating the controlled open mode P11. This timer is called "edge timer". This guarantees that the edge device 1 will be able to switch back to default protected mode P10 even in case the edge device 1 does not have a valid connection to the cloud-based edge management backend 21. This is reasonable, especially because there Is typically no guarantee that the edge device 1 is always connected to the edge management backend 21 that supervises the timespan of running the edge device 1 in controlled open mode P11.

Once the edge device 1 is in the second runtime mode P11, edge app developers and testers P gain an elevated access to the edge device 1 and can perform—in a step S6—software development operations on the edge app(s).

The software development operations may include but not restricted to one or more of the following activities:

Performing a remote login to an Edge app (e.g. SSH login to a Docker or OCI app container) with read and write access Accessing the Edge app's file system (e.g. WinSCP to a Docker or OCI app container) with read and write access Tracing Edge app log files in real-time mode (e.g. "tail—follow myapp.log")

Attaching a debugger to a running Edge app process

Attaching a CPU, main memory, disk or network I/O profiler to a running Edge app process Changing Edge app log levels to include debug-related log Information of the edge app into log output.

Once the timeout is reached (the predefined time period is expired) by the edge and/or backend timer, the system is switched back to the default protected mode P10—In a step S7. Switching back to the first runtime mode P10 can comprise stopping all remote access connections from the app developers and testers P and/or continuing in normal operation.

In a step S8 the system, e.g. the edge device 1 can directly or indirectly (via the edge management backend 21) Inform the admin A about switching back to the default protected mode P10. In this case the system administrator A can get informed that the edge device 1 is about to be reset into the first runtime mode P10. If necessary. the admin A can prevent switching and prolong the second runtime mode P11. Furthermore, the edge device 1 can inform the admin A that it had been successfully reset into the first runtime mode P10.

The above-mentioned elevated rights may include at least one of the following:

Remote login into containers of the at least one computer program with read-write access, Remote access read-write to a container file system of the at least one computer program, Remote online log tracing of the at least one computer program, Remote debugging of the at least one computer program, Remote profiling of the at least one computer program, Changing log levels to include debug-related log information of the at least one computer program into log output, Remote login to the embedded device's base system with read-only access, Remote login to runtime of the at least one computer program with read-only access.

In an embodiment the base system can be an operating system, in particular an operating system comprising a container management system.

In an embodiment the system may, e.g. automatically create a full snapshot of the edge base system before activating the second runtime mode P11. Furthermore, the system may automatically create a full snapshot of the edge app runtime and/or all edge apps and/or configuration and/or data. E.g. the system may back up all actively used partitions to a snapshot backup stored at a secure place that cannot be accessed by any person during the controlled open mode's P11 phase (e.g. on an additional secured disk partition).

The configuration, which can be a part of the snapshot, can be configuration data of the base system, in particular of the OS, of a container management system, of apps, in particular of apps containers.

The data, which can be a part of the snapshot, can be the at least one computer program's (e.g. app's) data (in particular recorded data of automation processes, e.g. audio/video/time series sensor/control data, of the above-mentioned automation systems).

In an embodiment, when leaving the controlled open mode P11, the system may, e.g. automatically restore the whole system to the snapshot state before the second runtime mode P11 was activated. In this case, one can allow app developers and testers P to access the whole system—excluding the secured snapshot backup—without any restrictions, i.e. with full access including write access on edge base system and edge app runtime. This can be beneficial e.g. for rapid prototyping, test case injection and advanced in-depth debugging without limitations. The embodiment still guarantees the edge device 1 to switch back to its initial state after leaving the controlled open mode P11. Any changes done by developers and testers P will be lost by intention. In case a software issue was identified any related fixes can be provisioned at a later point in time via other channels such as edge firmware and edge app downloads.

In an embodiment the predefined time period (e.g. 1 hour) can be prolonged prior to its expiration. The prolonging can be performed automatically, if certain conditions are met during the controlled open mode P11, or by the system administrator A, can hit a special "reset timer" button.

When the predefined time period is expired (at least one of the timers hits zero) the edge device 1 is set into the first runtime mode P10 either automatically or by the system administrator A.

In summary, there is no need for further developing and maintaining two different edge firmware versions "PROD" and "DEV". Such monitoring and debugging support in productive environments reduces the cost, raises time-to-market for new releases and requires less development resources.

Moreover, since an edge device, which can be uncontrollably switched in the first runtime mode for software development purposes, is not allowed by most of the operators of the automated systems, the methods and systems disclosed herein bring benefits for all parties participating in an ecosystem, e.g. for manufacturers of the edge devices, for (3$^{rd}$ party) edge app developers and for operators of the automated systems that use the edge devices and the edge apps.

The above described embodiments of the present disclosure are presented for purposes of illustration and not of limitation. In particular, the embodiments described with regard to figures are only few examples of the embodiments described in the introductory part. It will be appreciated by the person skilled in the art that technical features disclosed with regard to the methods can be used in the system and v/ca versa without leaving the scope of protection defined by the claims.

The reference signs in the claims used only for clarity purposes and shall not be considered to be a limiting part of the claims.

What is claimed is:

1. A method for controlling access to at least one computer program, the at least one computer program accessible and executable on an embedded system, the method comprising:
    providing the embedded system, the embedded system comprising two different runtime modes, the two different runtime modes comprising a first runtime mode and a second runtime mode, wherein in the first runtime mode a predefined set of IT-security constraints is associated with the at least one computer program, and in the second runtime mode at least a part of the predefined set of the IT-security constraints associated with the at least one computer program is void and the at least one computer program is accessible and executable with elevated rights for performing software development operations on the at least one computer program;
    setting the embedded system into the second runtime mode for a predefined time period, wherein setting the embedded system into the second runtime mode for a predefined time period is performed by a system administrator;
    resetting the embedded system into the first runtime mode after the predefined time period expires;
    requesting the system administrator to accept terms and disclaimers associated with the elevated rights; and
    reading and accepting the terms and disclaimers.

2. The method of claim 1, further comprising setting at least one timer to control an expiration of the predefined time period.

3. The method of claim 1, wherein the software development operations comprise at least one of the following:
    performing a remote login to the at least one computer program with read and write access;
    accessing the at least one computer program's file system with read and write access;
    tracing the at least one computer program's log files in real-time mode;
    attaching a debugger to a running process of the at least one computer program;
    attaching a CPU, main memory, disk or network I/O profiler to a running process of the at least one computer program;
    changing the at least one computer program's log levels.

4. The method of claim 1, wherein the elevated rights include at least one of the following access rights:
    remote login into containers of the at least one computer program with read-write access,
    remote access, in particular, read-write access to a container file system of the at least one computer program;
    remote online log tracing of the at least one computer program;
    remote debugging of the at least one computer program;
    remote profiling of the at least one computer program;
    changing log levels to include debug-related log information of the at least one computer program into log output;
    remote login to the embedded system's base system with read-only access;
    remote login to runtime of the at least one computer program with read-only access.

5. The method of claim 1, further comprising:
    creating, before setting the embedded system into the second runtime mode, in particular automatically creating, a snapshot, in particular a full snapshot of a system of the embedded system and/or of the at least one computer program runtime and/or of the at least one computer program and/or of configuration and/or of data; and restoring the embedded system to a previous state according to the snapshot when setting the embedded system into the first runtime mode.

6. The method of claim 1, wherein the embedded system is an edge device of an automation system, in particular of a Machine Controller, a Supervisory Control and Data Acquisition, more particularly of a Distributed Control System or of a Process Control System.

7. The method of claim 1, further comprising:
requesting the system administrator to accept terms and disclaimers regarding operational and/or service-level guarantees, which are in place, and
informing the system administrator at least once, before and/or after resetting, in particular automatically resetting, the at least one embedded system into the first runtime mode.

8. The method of claim 1, further comprising prolonging the predefined time period prior to its expiration.

9. A system for controlling access to at least one computer program, the system comprising:
at least one embedded system with the at least one computer program, wherein the at least one computer program is accessible and executable on the at least one embedded system, in particular at least one edge device, the at least one embedded system comprising two different runtime modes, the two different runtime modes comprising a first runtime mode and a second runtime mode, wherein, in the first runtime mode, a predefined set of IT-security constraints is associated with the at least one computer program, and in the second runtime mode, at least a part of the predefined set of the IT-security constraints associated with the at least one computer program is void and the at least one computer program is accessible and executable with elevated rights for performing software development operations on the at least one computer program; and
a management system of the at least one embedded system, the management system configured to set the at least one embedded system into the second runtime mode for a predefined time period, wherein setting the at least one embedded system into the second runtime mode for a predefined time period is performed by a system administrator, to switch the at least one embedded system into the first runtime mode after the predefined time period is expired, to request the system administrator to accept terms and disclaimers associated with the elevated rights and to read and accept the terms and disclaimers.

10. The system of claim 9, wherein at least two computer programs are accessible and executable on the at least one embedded system, and in the first runtime mode, a predefined set of IT-security constraints is associated with each computer program, and in the second runtime mode at least a part of the predefined set of the IT-security constraints is void for at least one of the at least two computer programs and the at least one computer program is accessible with elevated rights.

11. The system of claim 9, wherein the system comprises at least two embedded systems, wherein each embedded system comprises at least one computer program.

12. The system of claim 9, wherein the at least one embedded system is an edge device of an automation system, in particular of a Machine Controller, a Supervisory Control and Data Acquisition (SCADA), more particularly of a Distributed Control System (DCS) or of a Process Control System (PCS).

13. The system of claim 9, wherein the at least one computer program is an edge app.

14. The system of claim 9, wherein the management system and/or the at least one embedded system comprises a timer, and the timer is configured to control an expiration of the predefined time period.

15. The system of claim 9, wherein the management system comprises an apparatus for managing the at least one embedded system, in particular a backend server for managing the at least one embedded system, more particularly a cloud-backend-server for managing the at least one embedded system.

* * * * *